United States Patent
Liu et al.

(10) Patent No.: US 12,100,956 B1
(45) Date of Patent: Sep. 24, 2024

(54) ACTIVE POWER FILTERING-BASED HARMONIC SUPPRESSION METHOD, SYSTEM AND DEVICE USING VOC INVERTER

(71) Applicant: North China Electric Power University, Beijing (CN)

(72) Inventors: Chongru Liu, Beijing (CN); Chenbo Su, Beijing (CN); Jinyuan Wang, Beijing (CN); Shan Wang, Beijing (CN); Qi Hao, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 18/630,251

(22) Filed: Apr. 9, 2024

(30) Foreign Application Priority Data

Aug. 23, 2023 (CN) .......................... 202311066425.8

(51) Int. Cl.
  *H02J 3/24*  (2006.01)
  *G06F 17/13*  (2006.01)
  *H02J 3/01*  (2006.01)

(52) U.S. Cl.
  CPC ............... *H02J 3/24* (2013.01); *G06F 17/13* (2013.01); *H02J 3/01* (2013.01); *H02J 2203/20* (2020.01)

(58) Field of Classification Search
  CPC . H02J 3/24; H02J 3/01; H02J 2203/20; G06F 17/13

USPC ..... 307/105; 363/40, 95; 318/701, 802, 721, 318/727
See application file for complete search history.

(56) References Cited

U.S. PATENT DOCUMENTS

2024/0047969 A1* 2/2024 Chen ....................... H02J 3/388

OTHER PUBLICATIONS

Harmonic Detection for Shunt Active Power Filter Using ADALINE Neural Network, S Janpong et al.(MDPI publ: Jul. 19, 2021, Power Electronics Group, Suranaree Univ of Tech., Thailand, ) (Year: 2021).*
Notification to Grant Patent Right for Invention received in CN Application No. 202311066425.8, dated Jan. 18, 2024, in 2 pages (with translation).

* cited by examiner

*Primary Examiner* — Arnold M Kinkead
(74) *Attorney, Agent, or Firm* — Procopio, Cory, Hargreaves & Savitch LLP (57) ABSTRACT

A harmonic suppression method, system and device using active power filtering based on a Virtual Oscillator Control (VOC) inverter are provided. The method includes the following steps: firstly, the basic structure and control of VOC and its parameter design are given; then the parameters of VOC are designed; then the active filtering harmonic suppression strategy based on VOC is proposed; finally, the suppression strategy is applied in the grid-connected inverter system and its effectiveness is verified by simulation.

20 Claims, 6 Drawing Sheets

ACTIVE POWER FILTERING-BASED HARMONIC SUPPRESSION METHOD, SYSTEM AND DEVICE USING VOC INVERTER

CROSS-REFERENCE TO RELATED APPLICATION

This patent application claims the benefit and priority of Chinese Patent Application No. 202311066425.8 filed with the China National Intellectual Property Administration on Aug. 23, 2023, the disclosure of which is incorporated by reference herein in its entirety as part of the present application.

TECHNICAL FIELD

The present disclosure relates to the field of active power filtering-based harmonic suppression, in particular to active power filtering-based harmonic suppression method, system and device using a Virtual Oscillator Control (VOC) inverter.

BACKGROUND

In recent years, there are more and more harmonic current problems in a power system. Especially with the wide application and development of renewable energy based on power electronic components, the voltage distortion in a power grid has occurred, and the probability of power system failure or instability has also increased. Compared with the traditional synchronous generator set, the new energy generator set has faster adjustment speed and higher flexibility in connection to the power grid. However, the feeding of large-scale power electronic devices reduces the "inertia" of the power grid, thus resulting in harmonic problems in the power system. Therefore, how to effectively suppress harmonic oscillation is the key research content focus on the stability problem of the current "double-high" system (a power system with a high proportion of renewable energy and a high proportion of power electronic devices).

There are problems in the existing method of suppressing harmonic oscillation as follows.

At present, the method for suppressing harmonic oscillation mainly includes an active damping method and an active power filtering method. The essence of the active damping is the feedback control of the corresponding output frequency components near the resonance peak of the system. When the feedback is negative feedback, the deeper the feedback degree is, the better the suppression effect of the resonance peak can be achieved. One of the important ways to implement the active damping is the impedance remodeling technology. However, due to the frequency band overlapping effect in the impedance characteristics of each frequency band, the impedance remodeling for a specific frequency band will also affect the impedance characteristics of other frequency bands, which will lead to the impedance characteristics of other frequency bands changing from meeting the boundary stability conditions to not meeting the boundary stability conditions, and then lead to new oscillation problems in other frequency bands. The active power filtering method compensates for the distorted current of a nonlinear load by injecting the reversed current harmonic into the power grid, so as to achieve the purpose of eliminating harmonic. In order to avoid the instability of the power system resulted from the dynamics of phase-locked loop, the system stability is generally improved by filtering or adding feedback control, and the improved solution for feedforward control effectively suppresses the low-order harmonic in the grid-connected current while correcting the output impedance. However, because the phase-locked loop, the inverter control and the power system are nonlinear, it is complex and time-consuming for calculation during dq coordinate transformation or impedance modeling.

SUMMARY

The present disclosure aims to provide an active power filtering-based harmonic suppression method, system and device using a VOC inverter, which can reduce the calculation amount and speed up the response time.

In order to achieve the above purpose, the present disclosure provides the following solution.

An active power filtering-based harmonic suppression method using a Virtual Oscillator Control (VOC) inverter is provided, including:

adding voltage gain links and current gain links with different factors between a virtual oscillator circuit and an external circuit, setting the VOC inverter with different voltage and current levels, and calculating a differential equation of an oscillator circuit;

determining a differential equation of a controller averaging system according to the differential equation of the oscillator circuit;

based on the differential equation of the controller averaging system, performing parameter design of a VOC controller while ensuring sufficient adjustment of self-synchronization of the oscillator circuit; where the parameter design includes designing current gains and voltage gains, designing voltage regulation parameters and designing harmonic oscillator parameters, where the voltage regulation parameters include a conductance and a controlled current source cubic coefficient, and the harmonic oscillator parameters include an inductance of an inductor and a capacitance of a capacitor;

formulating a strategy of active power filtering harmonic suppression based on the VOC inverter according to the differential equation of the controller averaging system in combination with parameter design results; where the strategy of active power filtering harmonic suppression injects a compensation current output by the VOC inverter into a power grid as an input current, and simulates characteristics of a linear limit cycle oscillator by using the VOC inverter;

performing active power filtering harmonic suppression according to the strategy of active power filtering harmonic suppression.

Preferably, the differential equation of the oscillator circuit is:

$$\begin{cases} L\dfrac{di_L}{dt} = \dfrac{v}{K_v} \\ C\dfrac{dv}{dt} = -\alpha\dfrac{v^3}{K_v^2} + \sigma v - K_v i_L - K_v K_i i \end{cases};$$

where L is the inductance; $i_L$ is an inductance current of the virtual oscillator; v is a terminal voltage of the inverter; $K_v$ is a voltage gain factor; C is the capacitance; $\alpha$ is the controlled current source cubic coefficient; $K_i$ is a current gain factor; a is the conductance.

Preferably, determining the differential equation of a controller averaging system according to the differential equation of the oscillator circuit specifically includes:

in a Cartesian coordinate system, rewriting the differential equation of the oscillator circuit into a controller state space model which targeting an effective value of a voltage amplitude and an instantaneous phase in combination with a time domain equation and a steady-state limit cycle of a nonlinear oscillator average model;

determining a polar coordinate form of the controller state space model according to a polar coordinate transformation equation;

simplifying the polar coordinate form by using an averaging method, and determining an averaging system corresponding to a periodic system;

determining the differential equation of the controller averaging system by using the averaging system.

Preferably, the voltage gain factor of the voltage gain is: $K_v := \overline{V}_{oc}$; where Kv is a voltage gain factor; $\overline{V}_{oc}$ is a steady-state open-circuit voltage;

the current gain factor of the current gain is:

$$K_i := \frac{\overline{V}_{min}}{\overline{P}_{rated}};$$

where $K_i$ is a current gain factor; $\overline{V}_{min}$ is a minimum terminal voltage of the inverter; $\overline{P}_{rated}$ is a maximum rated load.

Preferably, designing voltage regulation parameters specifically includes:

determining the conductance according to the steady-state open-circuit voltage and the minimum terminal voltage of the inverter;

determining the controlled current source cubic coefficient according to the conductance.

Preferably, designing harmonic oscillator parameters specifically includes:

determining an frequency formula of the inverter according to frequency adjustment characteristics of the differential equation of the controller averaging system;

based on a maximum frequency deviation, solving the frequency formula of the inverter according to the current gain factor and the voltage gain factor, outputting a maximum reactive power under a condition of allowing the minimum terminal voltage of the inverter, and determining a lower bound of the capacitor value;

determining an ordinary differential equation according to the differential equation of the controller averaging system; where the ordinary differential equation is a voltage dynamic response;

determining rising time according to the ordinary differential equation;

determining an upper bound of the capacitance value according to the conductance and the rising time;

determining the inductance value of the inductor according to the lower bound of the capacitance value, the upper bound of the capacitance value and the resonance frequency.

Preferably, the compensation current $I_{compensation}(t)$ is $I_{compensation}(t) = -I_{Load.a.reactive}(t) + I_{Load.a.harmonic}(t)$; where $I_{Load.a.reactive}(t)$ is a harmonic component of the current; $I_{Load.a.harmonic}(t)$ is a fundamental frequency reactive component of a load.

An active power filtering-based harmonic suppression system using a VOC inverter is provided, including:

a differential equation calculating module of an oscillator circuit, which is configured to add voltage gain links and current gain links with different factors between a virtual oscillator circuit and an external circuit, set the VOC inverter with different voltage and current levels, and calculate a differential equation of an oscillator circuit;

a differential equation determining module of a controller averaging system, which is configured to determine a differential equation of the controller averaging system according to the differential equation of the oscillator circuit;

a parameter designing module, which is configured to, based on the differential equation of the controller averaging system, perform parameter design of a VOC controller while ensuring sufficient adjustment of self-synchronization of the oscillator circuit; where the parameter design includes designing current gains and voltage gains, designing voltage regulation parameters and designing harmonic oscillator parameters, where the voltage regulation parameters include a conductance and a controlled current source cubic coefficient, and the harmonic oscillator parameters include an inductance value of an inductor and a capacitance value of a capacitor;

a strategy formulating module of active power filtering harmonic suppression, which is configured to formulate a strategy of active power filtering harmonic suppression based on the VOC inverter according to the differential equation of the controller averaging system in combination with parameter design results; where the strategy of active power filtering harmonic suppression injects a compensation current output by the VOC inverter into a power grid as input current, and simulates characteristics of a linear limit cycle oscillator by using the VOC inverter;

an operating module of active power filtering harmonic suppression, which is configured to perform active power filtering harmonic suppression according to the strategy of active power filtering harmonic suppression.

An electronic device is provided, including a memory and a processor, where the memory is configured to store a computer program, and the processor runs the computer program so that the electronic device executes the active power filtering-based harmonic suppression method using the VOC inverter.

A computer-readable storage medium is provided, in which a computer program is stored, where the computer program, when executed by a processor, implements the active power filtering-based harmonic suppression method using the VOC inverter.

According to the specific embodiment provided by the present disclosure, the present disclosure discloses the following technical effects. The present disclosure provides an active power filtering-based harmonic suppression method, system and device using a VOC inverter. Different factors of voltage gain links and current gain links are added between a virtual oscillator circuit and an external circuit, the VOC inverter with different voltage and current levels is set, a differential equation of an oscillator circuit is calculated, and a strategy of active power filtering harmonic suppression based on the VOC inverter is formulated to perform active power filtering harmonic suppression. The VOC inverter has a faster response speed, stronger robustness, less energy loss, a better compensation effect, lower total harmonic distortion, and reduced power ripples. The strategy of active power filtering harmonic suppression based on the VOC inverter injects the compensation current output by the VOC inverter into the power grid as the input current, and uses the characteristics that the VOC inverter simulates a linear limit cycle oscillator, which has global synchronization ability and spontaneously tends to synchronously oscillating without depending on the initial conditions of the system. In addition, when the VOC inverter is connected to the power grid, there is no need to use a phase-locked loop, thus avoiding a series of problems such as slow response, complicated calculation and long time-consumption resulted from the phase-locked loop. The control accuracy will not be disturbed by harmonic current in the system, which can better adapt to the nonlinear network.

BRIEF DESCRIPTION OF THE DRAWINGS

In order to explain the embodiments of the present disclosure or the technical solutions in the prior art more clearly, the accompanying drawings that need to be used in the embodiments will be briefly introduced hereinafter. Obviously, the accompanying drawings illustrated below are only some embodiments of the present disclosure. For those skilled in the art, other drawings can be obtained according to these drawings without creative labor.

DETAILED DESCRIPTION OF THE EMBODIMENTS

The technical solutions in the embodiments of the present disclosure will be clearly and completely described with reference to the accompanying drawings in the embodiments of the present disclosure hereinafter. Apparently, the described embodiments are only some embodiments of the present disclosure, rather than all of the embodiments. Based on the embodiment of the present disclosure, all other embodiments obtained by those skilled in the art without creative labor belong to the scope of protection of the present disclosure.

The present disclosure aims to provide an active power filtering-based harmonic suppression method, system and device using a VOC inverter, which can reduce the calculation amount and speed up the response time.

In order to make the above objects, features and advantages of the present disclosure more obvious and understandable, the present disclosure will be explained in further detail with reference to the accompanying drawings and detailed description hereinafter.

Embodiment 1

Figure 1:
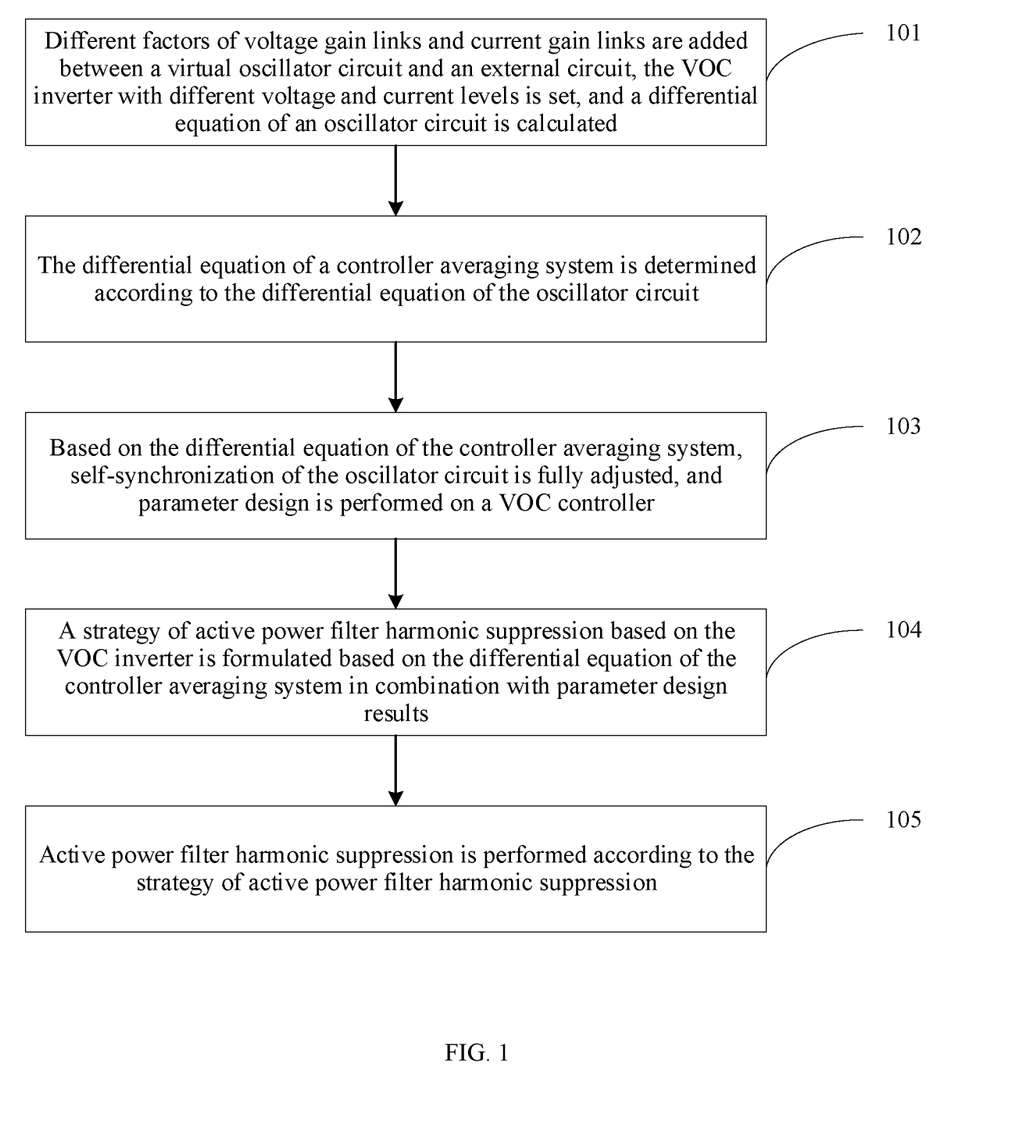
FIG. 1 is a flowchart of an active power filtering-based harmonic suppression method using a VOC inverter according to the present disclosure.

As shown in FIG. 1, the present disclosure provides an active power filtering-based harmonic suppression method using a VOC inverter, including step 101-105:

In step 101, voltage gain links and current gain links with different factors are provided between a virtual oscillator circuit and an external circuit, the VOC inverter with different voltage and current levels is set, and a differential equation of an oscillator circuit is calculated.

Figure 2:
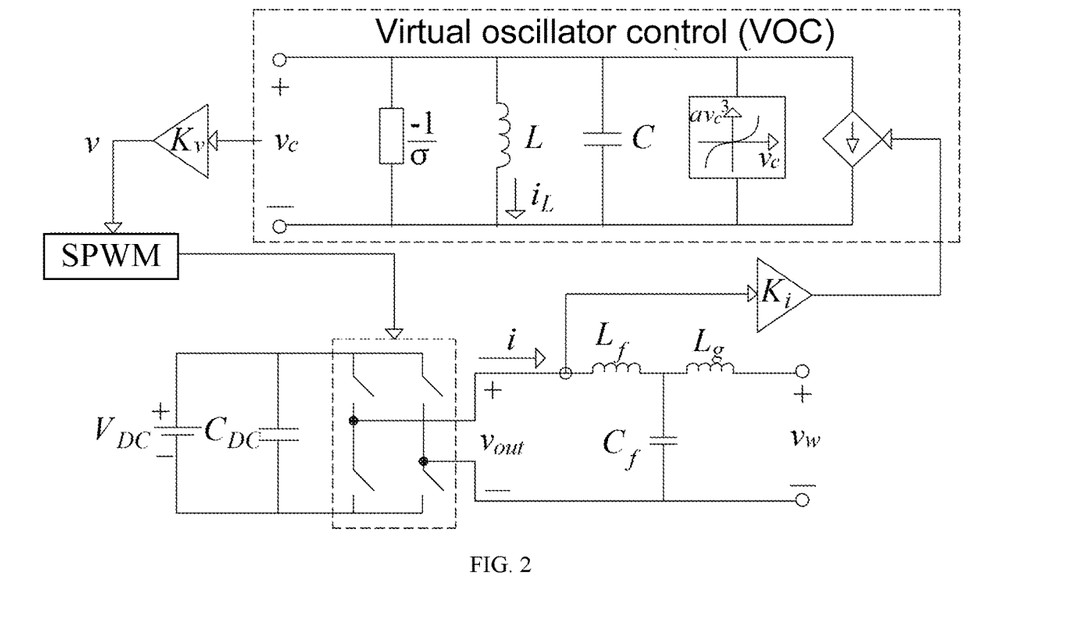
FIG. 2 is a structural diagram of the VOC inverter according to the present disclosure.

In practical application, the virtual oscillator control based on a Van der Pol oscillator circuit is used, and its structure is shown in FIG. 2, where i is outlet current of the VOC inverter; v is terminal voltage of the inverter; $v_c$ is outlet voltage of the virtual oscillator; $K_v$ is a voltage gain factor; a is conductance; L is inductance; $i_L$ is inductor current of the virtual oscillator; C is capacitance; a is cubic coefficient of a controlled current source; $K_i$ is current gain factor; $V_D C$ is direct current voltage; $C_{DC}$ is direct current capacitance; $v_{out}$ is outlet voltage of the VOC inverter; $C_f$ is capacitance of a filter; $L_f$ is inductance of a filter; $L_g$ is line inductance; $v_w$ is grid-connected voltage. The circuit structure mainly consists of three parts connected in parallel: i) a resonant LC circuit, which has the system frequency, and the resonant frequency of $\omega^* = 1/\sqrt{LC}$; ii) nonlinear voltage-dependent current source, which can maintain oscillation, and has a function of $i_s = \alpha v^3$, where $\alpha$ is a normal number; iii) a negative conductance damping element with $-1/\sigma$.

Because the rated voltage and rated current of different types of inverters are different, in order to meet the performance index of different inverters, it is necessary to design the respective parameters of different oscillator circuits. However, the design of the nonlinear oscillator circuit is very complicated, so that by adding a voltage gain link with $K_v$ factors and a voltage gain link with $K_i$ factors between the virtual oscillator circuit and the external circuit, it is convenient to design inverters with different voltage and current levels. As can be seen from FIG. 2, the differential equation of the oscillator circuit is:

$$\begin{cases} L\dfrac{di_L}{dt} = \dfrac{v}{K_v} \\ C\dfrac{dv}{dt} = -\alpha\dfrac{v^3}{K_v^2} + \sigma v - K_v i_L - K_v K_i i \end{cases} \qquad (1)$$

In step 102, the differential equation of a controller averaging system is determined according to the differential equation of the oscillator circuit.

The time domain equation v(t) can be expressed as:

$$v(t) = \sqrt{2}V(t)\cos(\omega t + \theta(t)) = \sqrt{2}V(t)\cos(\phi(t)), \qquad (2)$$

where $\omega$ is a frequency, $\phi(t)$ is a voltage instantaneous phase, V(t) is voltage of the controller averaging system, and $\theta(t)$ is an initial phase of the voltage of the controller averaging system. Now, the following definitions are given to simplify the symbol of the equation, so that it is convenient to obtain the steady-state limit cycle of the corresponding nonlinear oscillator average model:

$$\varepsilon := \sqrt{\frac{L}{C}}$$

$$g(v) := v - \frac{\beta}{3}v^3,$$

$$\beta := \frac{3\alpha}{K_v^3 \sigma}$$

(3)

where ε is the simplified parameter definition related to parameters L and C; g(v) is the simplified parameter definition related to parameters v and β; and β is the simplified parameter definition related to parameters $K_v$, α and σ.

In a Cartesian coordinate system, in combination with Equation (2) and Equation (3), Equation (1) is rewritten into a controller state space model with an effective value of a voltage amplitude and an instantaneous phase as the target. The inductor current $i_L$ and terminal voltage v are selected as state variables, and x:=$K_v \varepsilon i_L$, y:=v, and the time variable t is transformed into τ.

The state space model is shown in the following equation:

$$\begin{cases} \dot{x} = \frac{dx}{d\tau} = y \\ \dot{y} = \frac{dy}{d\tau} = -x + \varepsilon\sigma g(y) - \varepsilon K_v K_i i \end{cases}$$

(4)

where x is an equivalent state variable $K_v \varepsilon i_L$; y is an equivalent state variable v; i is a derivative of x; y is a derivative of y.

where the time constant is τ=ω*t=(1/√LC)t. The polar coordinate transformation is defined as:

$$\begin{cases} \sqrt{2} V = \sqrt{x^2 + y^2} \\ \phi = \tan^{-1}\left(\frac{x}{y}\right) \end{cases}$$

(5)

where V is a voltage amplitude of the averaging system; φ is a voltage phase of the averaging system.

The polar coordinate form of the state Equation (4) can be obtained from the Equation (5):

$$\begin{cases} \dot{V} = \frac{dV}{d\tau} = \frac{\varepsilon}{\sqrt{2}}\left(\sigma g(\sqrt{2}V\cos(\phi)) - K_v K_i i\right)\cos(\phi) \\ \dot{\phi} = \frac{d\phi}{d\tau} = 1 - \frac{\varepsilon}{\sqrt{2}V}\left(\sigma g(\sqrt{2}V\cos(\phi)) - K_v K_i i\right)\sin(\phi) \end{cases}$$

(6)

where $\dot{V}$ is a derivative of V; $\dot{\phi}$ is a derivative of φ; g is g(v) in the Equation (3).

On the basis of Equation (6), the averaging method is used to simplify the analysis. This method is an asymptotic method for solving the nonlinear differential equation, which is suitable for the system with the following forms:

$$\dot{x} = \varepsilon f(t, x, \varepsilon)$$ (7)

where e is a positive parameter, and the system is a periodic system. the period is set to $T_1$, that is:

$$f(t, x, \varepsilon) = f(t + T_1, x, \varepsilon),$$ (8)

The averaging system corresponding to this system is:

$$\bar{x} = \varepsilon f_{av}(\bar{x}),$$ (9)

where $\bar{x}$ is a derivative of the averaging system state variable, and $f_{av}(\bar{x})$ is an averaging system function corresponding to the average state variable x.

$$f_{av}(\bar{x}) = \frac{\varepsilon}{T_1}\int_0^{T_1} f(s, \bar{x}, 0)ds,$$ (10)

where s is a frequency domain operator; $\bar{x}$ is an averaging system state variable.

The idea of averaging method is to replace the nonlinear system represented by Equation (7) approximately with the averaging system represented by Equation (9). Through the above initial conditions, the differential equation of the controller averaging system can be derived as follows:

$$\frac{d}{dt}\bar{V} = \frac{\sigma}{2C}\left(\bar{V} - \frac{\beta}{2}\bar{V}^3\right) - \frac{K_v K_i}{2C\bar{V}}\bar{P}$$ (11)

$$\frac{d}{dt}\bar{\theta} = \omega^* - \omega + \frac{K_v K_i}{2C\bar{V}^2}\bar{Q},$$ (12)

where $\bar{V}$ is average voltage of the VOC inverter; $\bar{\theta}$ is average phase of the VOC inverter; $\bar{P}$ and $\bar{Q}$ are average active power and reactive power outputs of the control inverter, respectively. It can be concluded that the voltage amplitude and phase dynamics are directly related to $\bar{P}$ and $\bar{Q}$ of the inverter. Therefore, the differential equation of the above averaging system can be used to synthesize a virtual oscillator, so that the inverter can meet the voltage and frequency adjustment specifications in the sinusoidal steady state.

Figure 3:
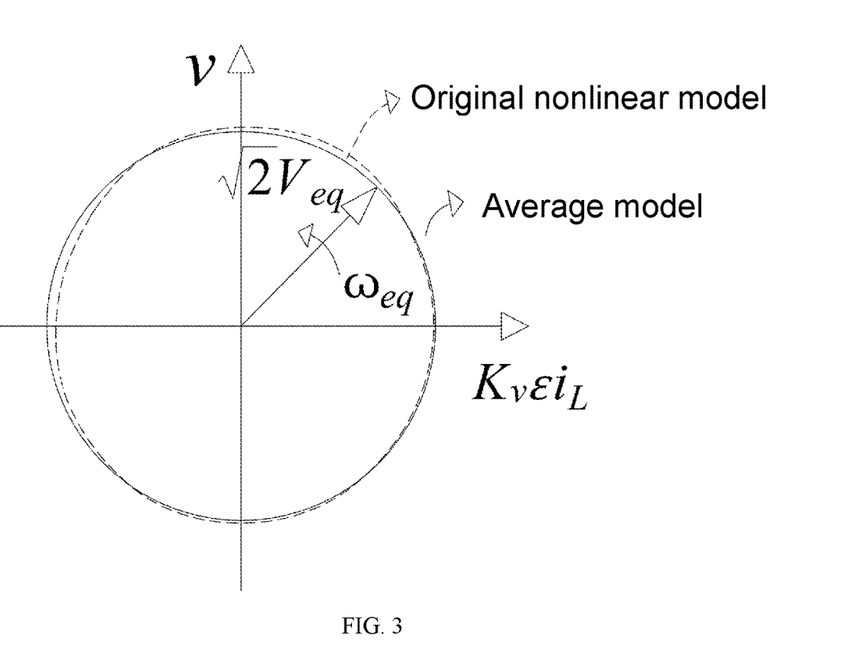
FIG. 3 is a schematic diagram of a superimposed steady-state limit cycle of an original nonlinear model and an average model according to the present disclosure.

FIG. 3 depicts a phase trajectory of the averaging system and a phase trajectory of the original nonlinear system in the steady state, where $V_{eq}$ is an equivalent voltage of the VOC inverter, $\omega_{eq}$ is an equivalent angular velocity of the VOC inverter, and ε is the simplified parameter definition related to parameters L and C. The phase trajectory of the averaging system is a standard circle, while the phase trajectory of the nonlinear system is distorted to some extent, which means that v contains a small amount of high-order harmonic. The smaller the ε is, the closer the two phase trajectories are, and the closer the oscillator is to sinusoidal oscillation.

In step 103, based on the differential equation of the controller averaging system, parameter design is performed on a VOC controller while the sufficient adjustment of self-synchronization of the oscillator circuit is ensured; where the parameter design includes designing current gains and voltage gains, designing voltage regulation parameters and designing harmonic oscillator parameters, where the voltage regulation parameters include conductance and cubic coefficient of the controlled current source, and the harmonic oscillator parameters include an inductance value of an inductor and a capacitance value of a capacitor.

In order to make the load voltage and the system frequency meet the performance index, parameter design is performed on the VOC controller. First, the sufficient conditions to ensure the self-synchronization of the oscillator circuit are defined. On this premise, the following parameters in the controller are designed: i) the current gain $K_i$ and the voltage gain $K_v$, ii) the voltage regulation parameters σ and α, and iii) the harmonic oscillator parameters L and C.

A. System Synchronization Conditions:

The VOC control makes use of the "resonance" characteristics of the oscillator circuit, so that the inverter can simulate the oscillator circuit. The shunt inverters can be synchronized regardless of values of the initial state variables such as a phase difference and a voltage difference between the inverters. The power angle stability interval among the VOC inverters is global, so that its synchronization ability depends not on inertia, but on the condition of "resonance".

It is assumed that $Z_{line}=R_{line}+j\omega L_f$ is the impedance of an output filter of the inverter, and $Z_{osc}$ is the impedance in a shunt branch including conductance, inductor and capacitor. $Z_{line}$ and $Z_{osc}$ are connected in parallel in the circuit. $R_{line}$ is the output filter resistance of the inverter.

According to Barbalat lemma, the sufficient conditions for the system to have self-synchronization are as follows:

$$\max_{\omega} \left\| \frac{(K_v K_i)^{-1} Z_{line} Z_{osx}}{(K_v K_i)^{-1} Z_{line} + Z_{osx}} \right\|_2 \frac{dg(v)}{dv} < 1, \tag{13}$$

where $\|\cdot\|_2$ is an Euclidean norm. It can be seen from the above equation that the synchronization condition depends on two design parameters, that is, the current gain and the voltage gain. The values of these parameters depend on voltage and rated power. The design parameters will be studied hereinafter.

B. Voltage and Current Gain:

As can be seen from FIG. 1, parameters $K_v$ and $K_i$ determine the voltage current ratio between the terminal voltage and the output current of the inverter and the VOC circuit, respectively. When $K_v$ is selected and the capacitor voltage is 1V RMS, the terminal voltage of the inverter is equal to the steady-state open-circuit voltage $\overline{V}_{oc}$. When $K_i$ is selected and the output current of the inverter is 1A, its load is the maximum rated load $\overline{P}_{rated}$. The values of $K_v$ and $K_i$ are shown in the following equation:

$$K_v := \overline{V}_{oc} \quad K_i := \frac{\overline{V}_{min}}{\overline{P}_{rated}}, \tag{14}$$

where $\overline{V}_{min}$ is the minimum voltage value of the averaging system.

When the steady-state open-circuit voltage $\overline{V}_{oc}$ is solved, the power balance condition of the inverter can be obtained from Equation (11):

$$\frac{\sigma\beta}{2} \overline{V}_{eq}^4 - \sigma \overline{V}_{eq}^2 + K_v K_i \overline{P}_{eq} = 0, \tag{15}$$

where $\overline{P}_{eq}$ and $\overline{V}_{eq}$ are the average voltage amplitude and active power output, respectively, and its positive root is:

$$\overline{V}_{eq} = K_v \left( \frac{\sigma \pm \sqrt{\sigma^2 - 6\alpha (K_i/K_v) \overline{P}_{eq}}}{3\alpha} \right)^{\frac{1}{2}}, \tag{16}$$

Then $\overline{P}_{eq}=0$ is substituted into Equation (16), and the open-circuit voltage of the inverter can be obtained:

$$\overline{V}_{oc} = K_v \sqrt{\frac{2\sigma}{3\alpha}}, \tag{17}$$

C. Design of voltage regulation parameters $\sigma$ and $\alpha$:

The conductance a and the controlled current source cubic coefficient a can be designed according to the voltage regulation characteristics of Equation (16). In the design, it is necessary to ensure that the balance voltage of the inverter terminal meets $\overline{V}_{min} \leq \overline{V}_{eq} \leq \overline{V}_{oc}$ to ensure that $0 \leq \overline{P}_{eq} \leq \overline{P}_{rated}$.

It can be seen from Equation (17) that on the premise of determining $K_v$, at this time, $$\alpha = \frac{2\sigma}{3}, \tag{18}$$

Then $\overline{P}_{eq}=\overline{P}_{rated}$ and $\overline{V}_{eq}=\overline{V}_{min}$ are substituted into Equation (16), and it can be concluded that:

$$\overline{V}_{min} = K_v \left( \frac{\sigma + \sqrt{\sigma^2 - 6\alpha (K_i/K_v) \overline{P}_{rated}}}{3\alpha} \right)^{\frac{1}{2}}, \tag{19}$$

Equation (14) and Equation (18) are substituted into Equation (19), which is simplified as:

$$\overline{V}_{min} = \overline{V}_{oc} \left( \frac{\sigma + \sqrt{\sigma^2 - 4\sigma (\overline{V}_{min}/\overline{V}_{oc})}}{2\sigma} \right)^{\frac{1}{2}}, \tag{20}$$

The conductance can be solved by Equation (20):

$$\sigma = \frac{\overline{V}_{oc}}{\overline{V}_{min}} \frac{\overline{V}_{oc}^2}{\overline{V}_{oc}^2 - \overline{V}_{min}^2}, \tag{21}$$

Finally, the controlled current source cubic coefficient a can be obtained from Equation (18).

D. Design of parameters L and C of the harmonic oscillator:

The parameters L and C of the harmonic oscillator are determined by frequency adjustment characteristics, rising time and the ratio of third harmonic to fundamental frequency.

From the frequency adjustment characteristic of Equation (12), the inverter frequency $\omega_{eq}$ can be obtained:

$$\omega_{eq} = \omega* + \frac{K_v K_i}{2C \overline{V}_{eq}^2} \overline{Q}_{eq}, \tag{22}$$

where $\overline{Q}_{eq}$ is the equivalent reactive power of the averaging system.

According to the maximum frequency deviation $|\Delta\omega|_{max}$ of the design input, $K_v$ and $K_i$ in Equation (14) are substituted into Equation (22). The maximum reactive power is output under a condition of allowing the minimum terminal voltage $\overline{V}_{min}$. The lower bound $C_{|\Delta\omega|_{max}}^{min}$ of the capacitance C is:

$$C \geq \frac{1}{2|\Delta\omega|_{max}} \frac{\overline{V}_{oc}}{\overline{V}_{min}} \frac{|\overline{Q}_{rated}|}{\overline{P}_{rated}} =: C_{|\Delta\omega|_{max}}^{min}, \quad (23)$$

where $\overline{Q}_{rated}$ is the maximum average reactive power that the inverter can obtain.

It is assumed that $\overline{P}=0$ in Equation (11), and the voltage dynamic response can be obtained:

$$\frac{d}{dt}\overline{V} = \frac{\sigma}{2C}\left(\overline{V} - \frac{\beta}{2}\overline{V}^3\right), \quad (24)$$

By integrating the two sides of the ordinary differential equation, the upper and lower bounds are set to 0.1 $V_{oc}$ and 0.9 KV, and the rising time $t_{rise}$ can be obtained:

$$t_{rise} \approx \frac{6}{\omega^*\varepsilon\sigma}, \quad (25)$$

In combination with Equation (21) and Equation (25), the allowable maximum rising time $t_{rise}^{max}$ is taken as the design input, the upper bound CM of the capacitance C can be obtained as follows:

$$C \leq \frac{t_{rise}^{max}}{6} \frac{\overline{V}_{oc}}{\overline{V}_{min}} \frac{\overline{V}_{oc}^2}{\overline{V}_{oc}^2 - \overline{V}_{min}^2} =: C_{t_{rise}}^{max}, \quad (26)$$

Finally, according to the ratio $\delta_{3:1}$ of the third harmonic to the fundamental frequency the following equation can be obtained:

$$\delta_{3:1} = \frac{\varepsilon\sigma}{8}, \quad (27)$$

With its maximum ratio as the design input, in combination with Equation (21) and Equation (27), the additional lower bound of capacitance C can be obtained:

$$C \geq \left(\frac{1}{8\omega^*\delta_{3:1}^{max}}\right) \frac{\overline{V}_{oc}}{\overline{V}_{min}} \frac{\overline{V}_{oc}^2}{\overline{V}_{oc}^2 - \overline{V}_{min}^2} =: C_{\delta_{3:1}}^{min}, \quad (28)$$

where $\delta_{3:1}^{max}$ is the ratio of the third harmonic to the fundamental frequency; $C_{\delta_{3:1}}^{min}$ is the lower bound of the capacitance C based on the ratio of the third harmonic to the fundamental frequency.

Thereafter, the range of the capacitance C can be determined according to Equation (23), Equation (26) and Equation (28). When the above conditions are met, the inductance L can be solved by $\omega^*=1/\sqrt{LC}$:

$$L = \frac{1}{C(\omega^*)^2}. \quad (29)$$

Thus, the parameters L and C of the harmonic oscillator can be determined.

In step 104, an active power filtering-based strategy using the VOC inverter is formulated according to the differential equation of the controller averaging system in combination with parameter design results; where the active power filtering-based harmonic suppression strategy injects compensation current output by the VOC inverter into a power grid as input current, and simulates characteristics of a linear limit cycle oscillator by using the VOC inverter.

In step 105, active power filtering-based harmonic suppression is performed according to the active power filtering-based harmonic suppression strategy.

Figure 4:
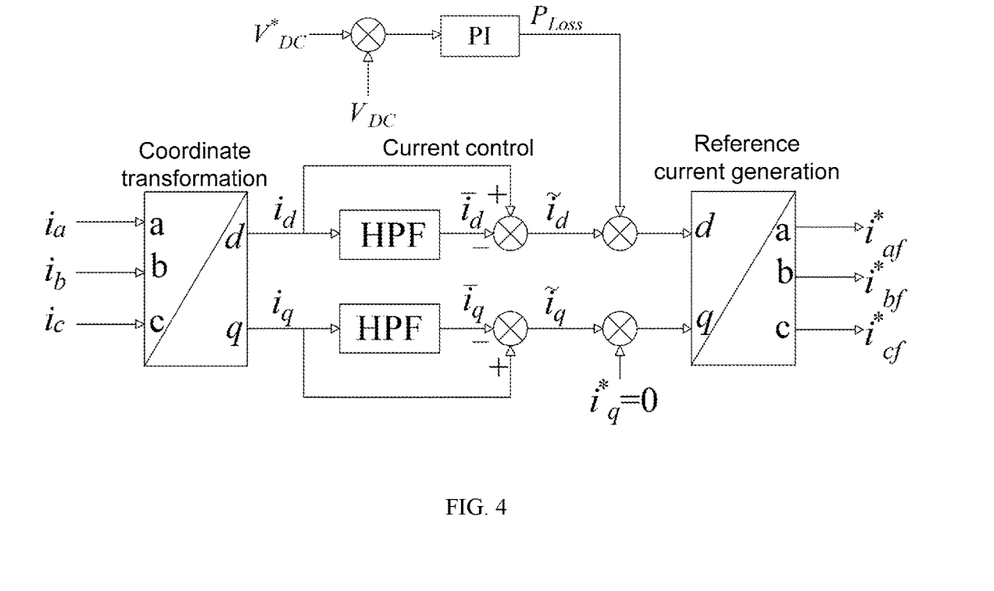
FIG. 4 is a control block diagram of a Shunt Active Power Filter (SAPF) according to the present disclosure.

The active power filter is mainly used to compensate for the distortion current of the nonlinear load. The compensation system applied in the present disclosure is referred to as an Active Power Filter (APF) or an SAPF, which usually includes a Voltage Source Inverter (VSI) and, in some embodiments, consists of a Voltage Source Inverter (VSI), and its output is connected to the power grid through decoupling inductor. The inverter is controlled by current, injecting current into the power grid to compensate for the current absorbed by the load. The injection compensation current generated by the active power filter should be:

$$I_{compensation}(t) = -I_{Load.a.reactive}(t) + I_{Load.a.harmonic}(t) \quad (30)$$

where $I_{Load.a.reactive}(t)$ and $I_{Load.a.harmonic}(t)$ are the harmonic component of the current and the fundamental frequency reactive component of the load, respectively. The present disclosure uses the id-iq control strategy to generate compensation current. The compensation system is shown in FIG. 4, where $V^*_{DC}$ is direct current voltage; $P_{LOSS}$ is the loss of the active power; PI is a PI controller; $i_a$ is the actual current of phase a; $i_b$ is the actual current of phase b; $i_c$ is the actual current of phase c; a is phase a; b is phase b; c is phase c; d is the d axis of the rotating coordinate system; q is the q axis of the rotating coordinate system; $i_d$ is the actual current of the d axis; $i_q$ is the actual current of the q axis; HPF is a high-pass filter; $1_d$ is the d-axis current filtered by the high-pass filter; $1_q$ is the q-axis current filtered by the high-pass filter; $1_d$ is the compensated d-axis current; $1_q$ is the compensated q-axis current; $i^*_q$ is a reference value of the q-axis current; $i^*_{af}$ is the generated current of the modulated phase a; $i^*_{bf}$ is the generated current of the modulated phase b; $i^*_{cf}$ is the generated current of the modulated phase c.

Figure 5:
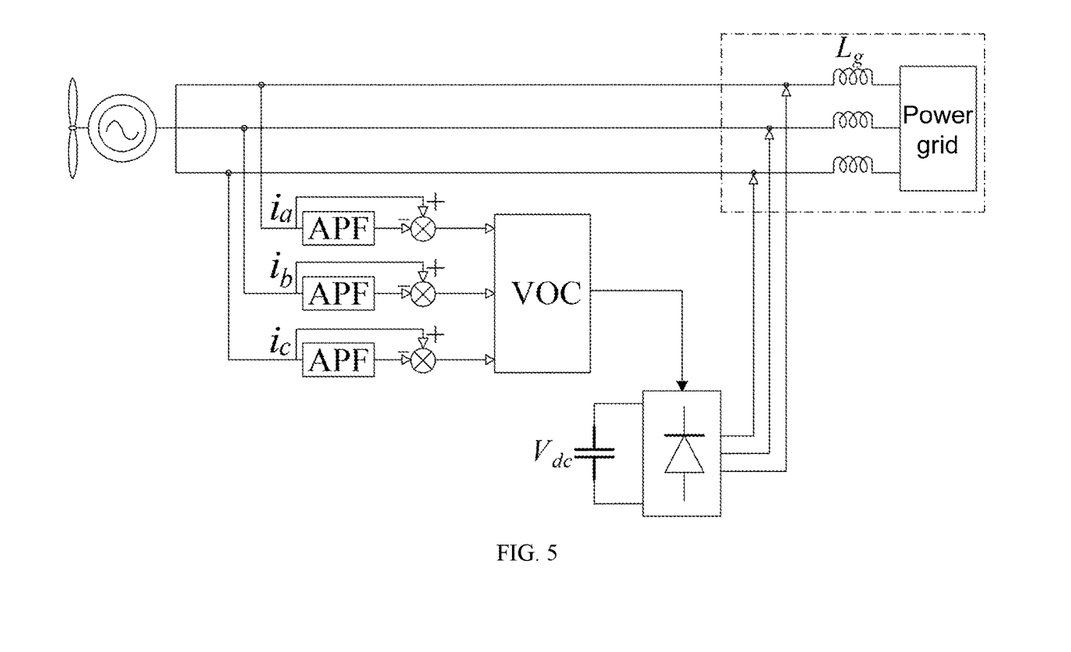
FIG. 5 is a schematic structural diagram of an active power filtering-based harmonic suppression strategy using the VOC inverter according to the present disclosure.

According to the present disclosure, on the basis of the traditional active power filter, the inverter is effectively controlled in combination with the VOC, and its overall structure is shown in FIG. 5, where $L_g$ is a line inductance, and $V_{dc}$ is the direct current voltage. The parameter design of the VOC part is shown in Step 103. The reference current obtained by the SAPF is sent to the VOC control. The VOC converts the reference current signal into the corresponding reference voltage, which is then applied to the inverter in the Pulse Width Modulation (PWM) cycle. Finally, the compensation current output by the inverter is injected into the power grid. In the low inertia power grid connected with new energy, the power angle stability of the inverter controlled by the VOC is independent of inertia and has strong robustness. In addition, the inertia of the power grid can be improved, and the stability of the system is enhanced.

Figure 6:
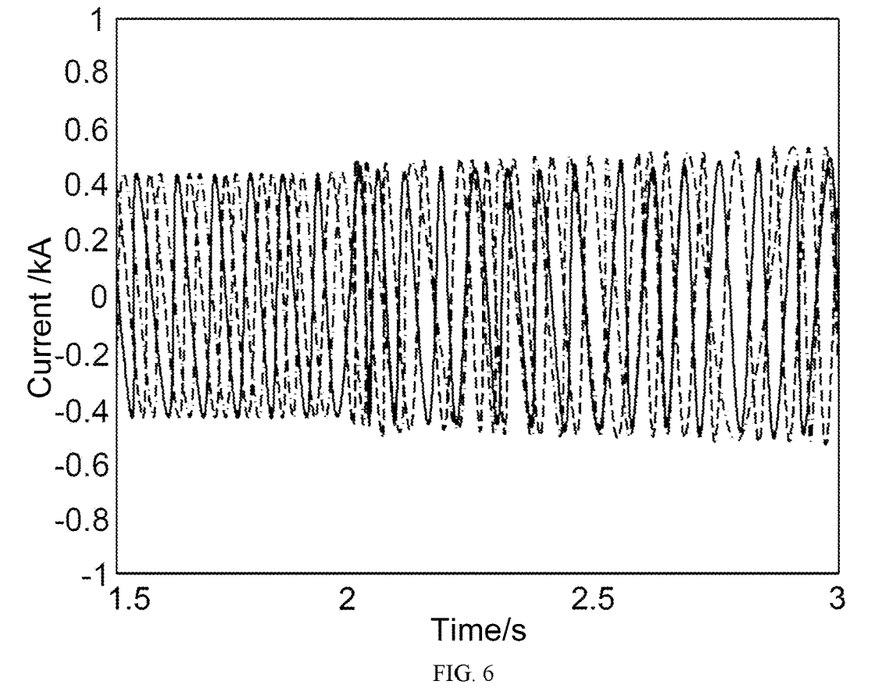
FIG. 6 is a schematic diagram of current dynamic response without a filter according to the present disclosure.
Figure 7:
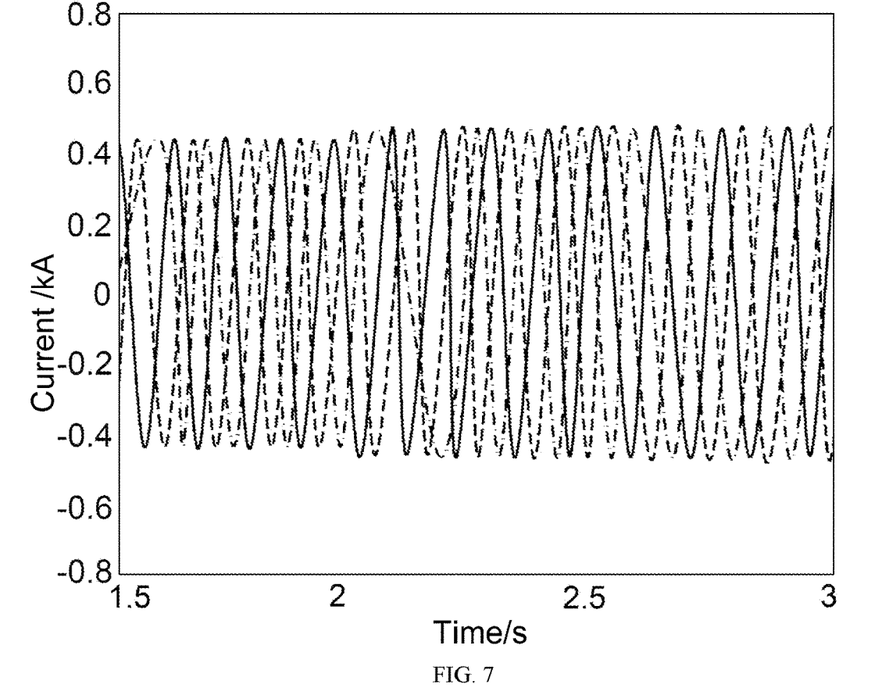
FIG. 7 is a schematic diagram of current dynamic response with an active damper according to the present disclosure.
Figure 8:
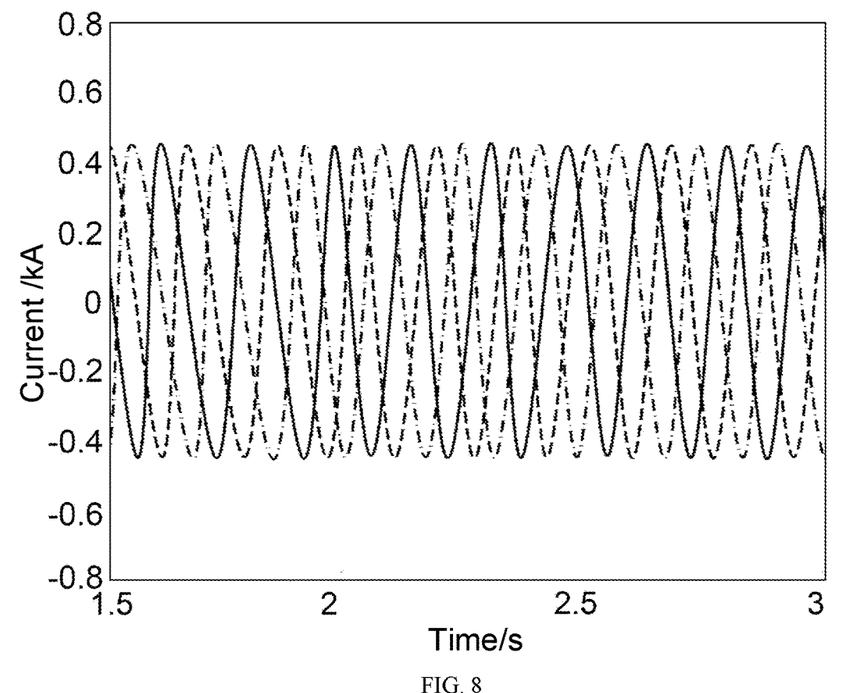
FIG. 8 is a schematic diagram of current dynamic response according to the present disclosure, which uses an active power filtering-based harmonic suppression strategy using the VOC inverter.
Figure 9:
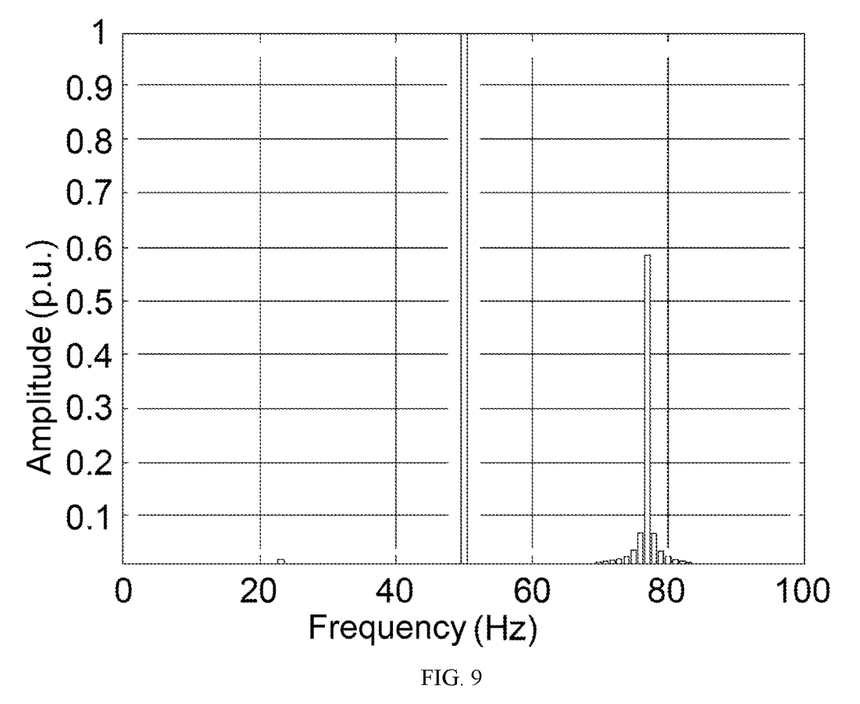
FIG. 9 is an FFT spectrum map of current without a filter according to the present disclosure.
Figure 10:
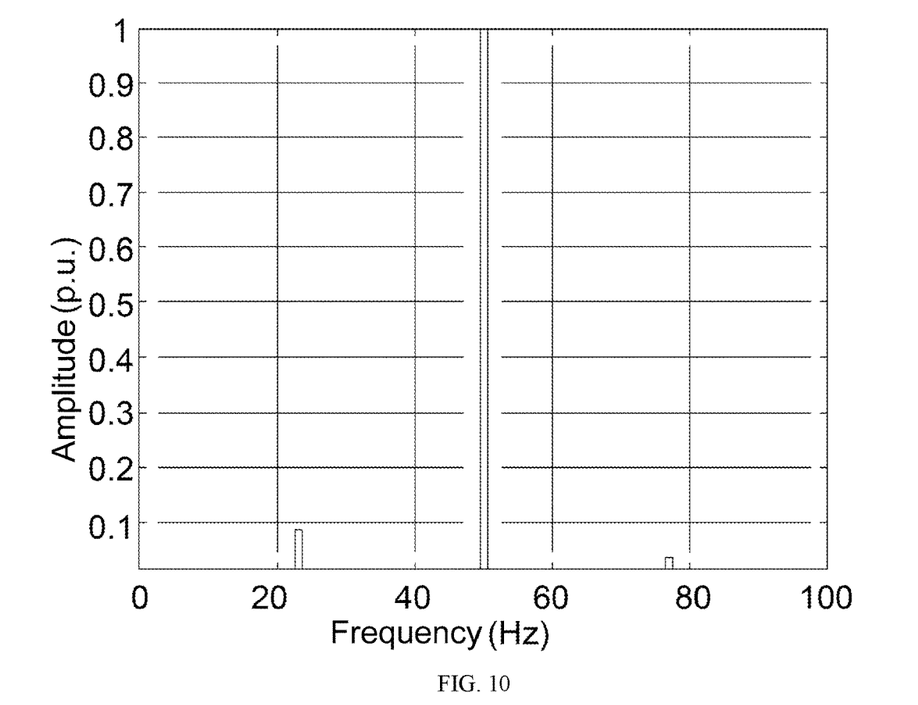
FIG. 10 is an FFT spectrum map of current with an active damper according to the present disclosure.
Figure 11:
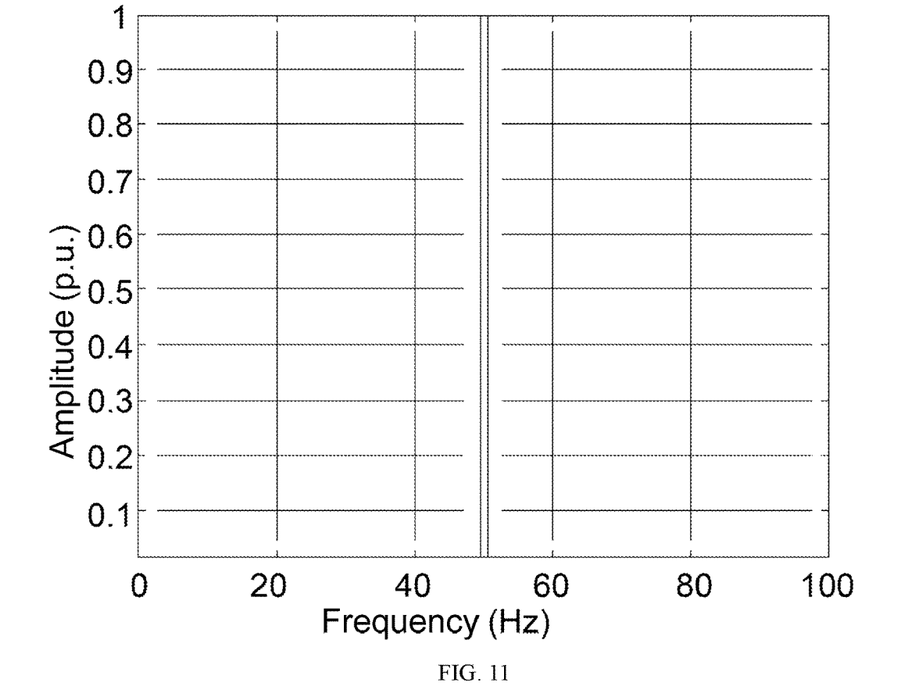
FIG. 11 is an FFT spectrum map of current using an active power filtering-based harmonic suppression strategy using the VOC inverter according to the present disclosure.

In order to verify the dynamic performance of the active power filtering-based harmonic suppression strategy using the VOC inverter, MATLAB/Simulink is used for simulation research. The simulation verification is carried out for the nonlinear load without a filter, with an active damper and with the harmonic suppression strategy according to the present disclosure. In order to observe the dynamic performance of the system, a small disturbance is set at t=2.0s. The dynamic response curve is shown in FIG. 6 to FIG. 8. FIG. 9 to FIG. 11 shows the spectrum map of three cases when t=4.0s.

The results show that the strategy proposed by the present disclosure can effectively eliminate the harmonic component generated by the nonlinear load, thereby improving the power quality. On the contrary, compared with the control without any filter, as shown in FIG. 9 to FIG. 11, the current is obviously distorted after disturbance, and the system oscillates. Although the active damper strategy reduces the current distortion to some extent, the frequency coupling phenomenon still exists, and the system tends to be unstable. From the simulation results, it can be seen that the active power filtering-based harmonic suppression strategy using the VOC inverter is very effective in eliminating harmonic.

According to the present disclosure, an inverter using the VOC is designed and implemented in the SAPF. As a nonlinear algorithm, the inverter has a faster response speed, stronger robustness, less energy loss, a better compensation effect, lower total harmonic distortion, and reduced power ripples. First, the basic structure, control and parameter design of the VOC are given. Thereafter, the parameters of the VOC are designed. Subsequently, an active power filtering-based harmonic suppression strategy using the VOC is proposed. Finally, the suppression strategy is applied to the grid-connected inverter system, and its effectiveness is verified by simulation. Compared with the traditional control strategy, the active power filtering-based harmonic suppression strategy using the VOC has the following advantages.

1) The VOC strategy only needs the output current of the inverter as input, harmonic is eliminated without voltage measurement and power calculation or without using power filters, so as to obtain the average output power required for droop control.

2) The inverter in the VOC strategy simulates characteristics of the nonlinear limit cycle oscillator, which has global synchronization ability and spontaneously tends to synchronously oscillating without depending on the initial conditions of the system.

3) The average dynamic and droop control of the VOC in an alternating current cycle have similar steady-state characteristics, but its response speed is faster, its robustness is stronger and its energy loss is less.

4) When the VOC inverter is connected to the power grid, there is no need to use a phase-locked loop, thereby avoiding a series of problems such as slow response, complicated calculation and long time-consumption resulted from the phase-locked loop. The control accuracy will not be disturbed by harmonic current in the system, which can better adapt to the nonlinear network.

Embodiment 2

In order to implement the corresponding method in Embodiment 1 described above so as to implement the corresponding functions and technical effects, an active power filtering-based harmonic suppression system using a VOC inverter is provided hereinafter.

An active power filtering-based harmonic suppression system using a VOC inverter includes a differential equation calculating module, a differential equation determining module, a parameter designing module, a strategy formulating module, and an operating module.

A differential equation calculating module of an oscillator circuit is configured to add voltage gain links and current gain links with different factors between a virtual oscillator circuit and an external circuit, set the VOC inverter with different voltage and current levels, and calculate a differential equation of an oscillator circuit.

A differential equation determining module of a controller averaging system is configured to determine the differential equation of a controller averaging system according to the differential equation of the oscillator circuit.

A parameter designing module is configured to, based on the differential equation of the controller averaging system, perform parameter design of a VOC controller while ensuring sufficient adjustment of self-synchronization of the oscillator circuit. Where the parameter design includes designing current gains and voltage gains, designing voltage regulation parameters and designing harmonic oscillator parameters, the voltage regulation parameters include conductance and a controlled current source cubic coefficient, and the harmonic oscillator parameters include an inductance value of an inductor and a capacitance value of a capacitor.

A strategy formulating module of active power filtering harmonic suppression is configured to formulate a strategy of active power filtering harmonic suppression based on the VOC inverter according to the differential equation of the controller averaging system in combination with parameter design results. Where the strategy of active power filtering harmonic suppression injects compensation current output by the VOC inverter into a power grid as input current, and simulates characteristics of a linear limit cycle oscillator by using the VOC inverter.

An operating module of active power filtering harmonic suppression is configured to perform active power filtering harmonic suppression according to the strategy of active power filtering harmonic suppression.

Embodiment 3

An electronic device provided by the embodiment of the present disclosure includes a memory and a processor. Where the memory is configured to store a computer program, and the processor runs the computer program so that the electronic device executes the method of enabling multi-party 5G message interaction provided by Embodiment 1.

In practical application, the electronic device can be a server.

In practical application, the electronic device includes at least one processor, a memory, a bus and a communications interface.

The processor, the communication interface and the memory communicate with each other through a communication bus.

The communication interface is configured to communicate with other devices.

The processor is configured to execute the program, and can specifically execute the method described in the above embodiment.

Specifically, the program may include a program code, which includes computer operation instructions.

The processor may be a Central Processing Unit (CPU), or an Application Specific Integrated Circuit (ASIC), or one or more integrated circuits configured to implement the embodiments of the present disclosure. One or more processors included in the electronic device can be the same type of processors, such as one or more CPU; or different types of processors, such as one or more CPUs and one or more ASICs.

The memory is configured to store programs. The memory may include a high-speed RAM memory, and may also include a non-volatile memory, such as at least one disk memory.

Based on the description of the above embodiments, an embodiment of the application provides a storage medium in which computer program instructions are stored. The computer program instructions can be executed by a processor to implement the method described in any embodiment.

The system enabling multi-party 5G message interaction provided by the embodiment of the present disclosure exists in various forms, including but not limited to the following devices (1)-(4).

(1) Mobile communication devices: such devices are characterized by a mobile communication function, and its main goal is to provide voice and data communication. Such terminals include smart phones (such as iPhone), multimedia phones, functional phones, and low-end phones.

(2) Ultra-mobile personal computer devices: such devices belong to the category of personal computers, which have the functions of calculation and processing, and generally have the performance of mobile Internet access. Such terminals include devices of personal digital assistant (PDA), Mobile Internet Device (MID) and Ultra-mobile Personal Computer (UMPC), such as iPad.

(3) Portable entertainment devices: such devices can display and play multimedia content. Such devices include: audio and/or video players (such as iPod), handheld game consoles, e-books, as well as smart toys and portable vehicle navigation devices.

(4) Other electronic devices with data interaction function are also included.

So far, specific embodiments of the present subject matter have been described. Other embodiments fall within the scope of the appended claims. In some cases, the actions recited in the claims can be performed in a different order and still achieve the desired results. In addition, the processes depicted in the drawings do not necessarily require the shown specific order or the sequential order to achieve the desired results. In some embodiments, multitasking processing and parallel processing may be advantageous.

The systems, devices, modules or units set forth in the above embodiments can be implemented by computer chips or entities or by products with certain functions. A typical implementation device is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device or a combination of any of these devices.

For the convenience of description, when describing the above devices, the functions are divided into various units and described separately. Certainly, the functions of each unit can be implemented in the same one or more software and/or hardware when the present disclosure is implemented. It should be understood by those skilled in the art that the embodiments of the present disclosure can be provided as a method, a system or a computer program product. Therefore, the present disclosure can take the form of an entirely hardware embodiment, an entirely software embodiment or an embodiment combining software and hardware aspects. Moreover, the present disclosure can take the form of a computer program product implemented on one or more computer-usable storage media (including but not limited to a disk storage, CD-ROM, an optical storage, etc.) which contain computer-usable program codes.

The present disclosure is described with reference to flowcharts and/or block diagrams of methods, devices (systems) and computer program products according to the embodiments of the present disclosure. It should be understood that each flow and/or block in the flowchart and/or block diagram, and combinations of the flow and/or block in the flowchart and/or block diagram can be implemented by computer program instructions. These computer program instructions may be provided to a processor of a general-purpose computer, a special-purpose computer, an embedded processor or other programmable data processing devices to produce a machine, so that the instructions which are executed by the processor of the computer or other programmable data processing devices produce means for implementing the functions specified in one or more flows in the flowchart and/or one or more blocks in the block diagram.

These computer program instructions may also be stored in a computer-readable memory that can direct a computer or other programmable data processing devices to operate in a particular manner, so that the instructions stored in the computer-readable memory produce an article of manufacture including instruction means, and the instruction means implement the functions specified in one or more flows in the flowchart and/or one or more blocks in the block diagram.

These computer program instructions may also be loaded onto a computer or other programmable data processing devices, so that a series of operating steps are performed on the computer or other programmable devices to produce a computer-implemented process, such that the instructions executed on the computer or other programmable devices provide steps for implementing the functions specified in one or more flows in the flowchart and/or one or more blocks in the block diagram.

In a typical configuration, a computing device includes one or more processors (CPU), an input/output interface, a network interface, and a memory.

The memory may include a non-permanent memory, a Random Access Memory (RAM) and/or a nonvolatile memory in computer-readable media, such as a Read-Only Memory (ROM) or a flash memory (flash RAM). The memory is an example of a computer-readable medium.

The computer-readable media, including permanent and non-permanent, removable and non-removable media, can store information by any method or technology. Information can be computer-readable instructions, data structures, modules of programs or other data. Examples of computer storage media include, but are not limited to, a Phase Change RAM (PRAM), a Static Random Access Memory (SRAM), a Dynamic Random Access Memory (DRAM), other types of Random Access Memories (RAM), Read-Only Memories (ROM), Electrically Erasable Programmable Read-Only Memories (EEPROM), flash memories or other memory technologies, Compact Disk Read Only Memories (CD-ROM), Digital Versatile Discs (DVD) or other optical storages, magnetic cassettes, magnetic tapes, magnetic disk storages or other magnetic storage devices or any other non-transmission medium that can be used to store information that can be accessed by computing devices. According to the definition in the present disclosure, the computer-readable media does not include transitory computer-readable media, such as modulated data signals and carrier waves.

It should also be noted that the terms "including", "comprising" or any other variation thereof are intended to cover non-exclusive inclusion, so that a process, a method, a commodity or a device including a series of elements includes not only those elements, but also other elements not explicitly listed, or elements inherent to such process, method, commodity or device. Without more restrictions, an element defined by the phrase "including one . . ." does not exclude the existence of other identical elements in the process, method, commodity or device including the elements.

The present disclosure may be described in the general context of computer-executable instructions, such as program modules, which are executed by a computer. Generally, the program modules include routines, programs, objects, components, data structures, etc. that perform specific transactions or implement specific abstract data types. The present disclosure can also be practiced in distributed computing environments where transactions are performed by remote processing devices that are connected through a communication network. In the distributed computing environments, the program modules may be located in local and remote computer storage media including storage devices.

In this specification, various embodiments are described in a progressive way. The differences between each embodiment and other embodiments are highlighted, and the same and similar parts of various embodiments can be referred to each other. Because the system disclosed in the embodiment corresponds to the method disclosed in the embodiment, the system is described simply, and the relevant information refers to the description of the method part.

In the present disclosure, specific examples are applied to illustrate the principle and implementation of the present disclosure, and the explanations of the above embodiments are only used to help understand the method and core ideas of the present disclosure. At the same time, according to the idea of the present disclosure, there will be some changes in terms of the specific implementation and application scope for those skilled in the art. To sum up, the contents of the specification should not be construed as limiting the present disclosure.

What is claimed is:

1. An active power filtering-based harmonic suppression method using a Virtual Oscillator Control (VOC) inverter, comprising:
   providing voltage gain and current gain links with different factors between a virtual oscillator circuit and an external circuit, providing the VOC inverter with different voltage and current levels, and calculating a differential equation of an oscillator circuit;
   determining a differential equation of a controller averaging system according to the differential equation of the oscillator circuit;
   based on the differential equation of the controller averaging system, performing parameter design of a VOC controller while ensuring sufficient adjustment of self-synchronization of the oscillator circuit; wherein the parameter design comprises designing current gains and voltage gains, designing voltage regulation parameters and designing harmonic oscillator parameters, wherein the voltage regulation parameters comprise a conductance and a controlled current source cubic coefficient, and the harmonic oscillator parameters comprise an inductance of an inductor and a capacitance of a capacitor;
   formulating an active power filtering-based harmonic suppression strategy using the VOC inverter, according to the differential equation of the controller averaging system in combination with parameter design results; wherein the active power filtering-based harmonic suppression strategy injects a compensation current output by the VOC inverter into a power grid as an input current, and simulates characteristics of a linear limit cycle oscillator by using the VOC inverter;
   performing active power filtering-based harmonic suppression according to the active power filtering-based harmonic suppression strategy.

2. The method according to claim 1, wherein the differential equation of the oscillator circuit is:

$$\begin{cases} L\dfrac{di_L}{dt} = \dfrac{v}{K_v} \\ C\dfrac{dv}{dt} = -\alpha\dfrac{v^3}{K_v^2} + \sigma v - K_v i_L - K_v K_i i \end{cases};$$

where L is the inductance of the inductor; $i_L$ is an inductor current of the virtual oscillator; v is a terminal voltage of the inverter; $K_v$ is a voltage gain factor; C is the capacitance of the capacitor; a is the controlled current source cubic coefficient; $K_i$ is a current gain factor; σ is the conductance.

3. The method according to claim 1, wherein determining the differential equation of a controller averaging system according to the differential equation of the oscillator circuit specifically comprises:
   in a Cartesian coordinate system, rewriting the differential equation of the oscillator circuit into a controller state space model with an effective value of a voltage amplitude and an instantaneous phase as target in combination with a time domain equation and a steady-state limit cycle of a nonlinear oscillator average model;
   determining a polar coordinate form of the controller state space model according to a polar coordinate transformation equation;
   simplifying the polar coordinate form by using an averaging method, and determining an averaging system corresponding to a periodic system;
   determining the differential equation of the controller averaging system by using the averaging system.

4. The method according to claim 1, wherein the voltage gain factor of the voltage gain is: $K_v := \overline{V}_{oc}$; where $K_v$ is a voltage gain factor; $\overline{V}_{oc}$ is a steady-state open-circuit voltage; the current gain factor of the current gain is:

$$K_i := \dfrac{\overline{V}_{min}}{\overline{P}_{rated}};$$

where $K_i$ is a current gain factor; $\overline{V}_{min}$ is a minimum terminal voltage of the inverter; $\overline{P}_{rated}$ is a maximum rated load.

5. The method according to claim 4, wherein the designing voltage regulation parameters specifically comprises:
   determining the conductance according to the steady-state open-circuit voltage and the minimum terminal voltage of the inverter;
   determining the controlled current source cubic coefficient according to the conductance.

6. The method according to claim 5, wherein the designing harmonic oscillator parameters specifically comprises:
   determining a frequency formula of the inverter according to frequency adjustment characteristics of the differential equation of the controller averaging system;
   based on a maximum frequency deviation, solving the frequency formula of the inverter according to a current gain factor and a voltage gain factor, outputting a maximum reactive power under the minimum allowable terminal voltage of the inverter, and determining a lower bound of the capacitance value;
determining an ordinary differential equation according to the differential equation of the controller averaging system; wherein the ordinary differential equation is a voltage dynamic response;
determining rising time according to the ordinary differential equation;
determining an upper bound of the capacitance value according to the conductance and the rising time;
determining inductance value of the inductor according to the lower bound of the capacitance value, the upper bound of the capacitance value and resonance frequency.

7. The method according to claim 5, wherein the compensation current $I_{compensation}(t)$ is $I_{compensation}(t) = -I_{Load.a.reactive}(t) + I_{Load.a.harmonic}(t)$; wherein $I_{Load.a.reactive}(t)$ is a harmonic component of the current; $I_{Load.a.harmonic}(t)$ is a fundamental frequency reactive component of a load.

8. An active power filtering-based harmonic suppression system using a VOC inverter, comprising:
   a differential equation calculating module of an oscillator circuit, which is configured to provide voltage gain and current gain links with different factors between a virtual oscillator circuit and an external circuit, providing the VOC inverter with different voltage and current levels, and calculate a differential equation of an oscillator circuit;
   a differential equation determining module of a controller averaging system, which is configured to determine a differential equation of the controller averaging system according to the differential equation of the oscillator circuit;
   a parameter designing module, which is configured to, based on the differential equation of the controller averaging system, perform parameter design of a VOC controller while ensuring sufficient adjustment of self-synchronization of the oscillator circuit; wherein the parameter design comprises designing current gains and voltage gains, designing voltage regulation parameters and designing harmonic oscillator parameters, wherein the voltage regulation parameters comprise a conductance and a controlled current source cubic coefficient, and the harmonic oscillator parameters comprise an inductance of an inductor and a capacitance of a capacitor;
   a strategy formulating module of active power filtering-based harmonic suppression, which is configured to formulate an active power filtering-based harmonic suppression strategy using the VOC inverter according to the differential equation of the controller averaging system in combination with parameter design results; wherein the active power filtering-based harmonic suppression strategy injects a compensation current output by the VOC inverter into a power grid as an input current, and simulates characteristics of a linear limit cycle oscillator by using the VOC inverter;
   an operating module of active power filtering-based harmonic suppression, which is configured to perform active power filtering-based harmonic suppression according to the active power filtering-based harmonic suppression strategy.

9. An electronic device, comprising a memory and a processor, wherein the memory is configured to store computer program, and the processor runs the computer program so that the electronic device executes the active power filtering-based harmonic suppression method using the VOC inverter according to claim 1.

10. The electronic device according to claim 9, wherein the differential equation of the oscillator circuit is:

$$\begin{cases} L\dfrac{di_L}{dt} = \dfrac{v}{K_v} \\ C\dfrac{dv}{dt} = -\alpha\dfrac{v^3}{K_v^2} + \sigma v - K_v i_L - K_v K_i i \end{cases};$$

where L is the inductance of the inductor; $i_L$ is an inductor current of the virtual oscillator; v is a terminal voltage of the inverter; $K_v$ is a voltage gain factor; C is the capacitance of the capacitor; a is the controlled current source cubic coefficient; $K_i$ is a current gain factor; σ is the conductance.

11. The electronic device according to claim 9, wherein determining the differential equation of a controller averaging system according to the differential equation of the oscillator circuit specifically comprises:
   in a Cartesian coordinate system, rewriting the differential equation of the oscillator circuit into a controller state space model with an effective value of a voltage amplitude and an instantaneous phase as target in combination with a time domain equation and a steady-state limit cycle of a nonlinear oscillator average model;
   determining a polar coordinate form of the controller state space model according to a polar coordinate transformation equation;
   simplifying the polar coordinate form by using an averaging method, and determining an averaging system corresponding to a periodic system;
   determining the differential equation of the controller averaging system by using the averaging system.

12. The electronic device according to claim 9, wherein the voltage gain factor of the voltage gain is: $K_v := \overline{V}_{oc}$; where $K_v$ is a voltage gain factor; $\overline{V}_{oc}$ is a steady-state open-circuit voltage;
the current gain factor of the current gain is:

$$K_i := \dfrac{\overline{V}_{min}}{\overline{P}_{rated}};$$

where $K_i$ is a current gain factor; $\overline{V}_{min}$ is a minimum terminal voltage of the inverter; $\overline{P}_{rated}$ is a maximum rated load.

13. The electronic device according to claim 12, wherein the designing voltage regulation parameters specifically comprises:
   determining the conductance according to the steady-state open-circuit voltage and the minimum terminal voltage of the inverter;
   determining the controlled current source cubic coefficient according to the conductance.

14. The electronic device according to claim 13, wherein the designing harmonic oscillator parameters specifically comprises:
   determining a frequency formula of the inverter according to frequency adjustment characteristics of the differential equation of the controller averaging system;
   based on a maximum frequency deviation, solving the frequency formula of the inverter according to a current gain factor and a voltage gain factor, outputting a maximum reactive power under the minimum allowable terminal voltage of the inverter, and determining a lower bound of the capacitance value;

determining an ordinary differential equation according to the differential equation of the controller averaging system; wherein the ordinary differential equation is a voltage dynamic response;

determining rising time according to the ordinary differential equation;

determining an upper bound of the capacitance value according to the conductance and the rising time;

determining inductance value of the inductor according to the lower bound of the capacitance value, the upper bound of the capacitance value and resonance frequency.

15. The electronic device according to claim 13, wherein the compensation current $I_{compensation}(t)$ is $I_{compensation}(t) = -I_{Load.a.reactive}(t) + I_{Load.a.harmonic}(t)$; wherein $I_{Load.a.reactive}(t)$ is a harmonic component of the current; $I_{Load.a.harmonic}(t)$ is a fundamental frequency reactive component of a load.

16. A non-transitory computer-readable storage medium in which a computer program is stored, wherein the computer program, when executed by a processor, implements the active power filtering-based harmonic suppression method using the VOC inverter according to claim 1.

17. The non-transitory computer-readable storage medium according to claim 16, wherein the differential equation of the oscillator circuit is:

$$\begin{cases} L\dfrac{di_L}{dt} = \dfrac{v}{K_v} \\ C\dfrac{dv}{dt} = -\alpha \dfrac{v^3}{K_v^2} + \sigma v - K_v i_L - K_v K_i i \end{cases};$$

where L is the inductance of the inductor; $i_L$ is an inductor current of the virtual oscillator; v is a terminal voltage of the inverter; $K_v$ is a voltage gain factor; C is the capacitance of the capacitor; a is the controlled current source cubic coefficient; $K_i$ is a current gain factor; $\sigma$ is the conductance.

18. The non-transitory computer-readable storage medium according to claim 16, wherein determining the differential equation of a controller averaging system according to the differential equation of the oscillator circuit specifically comprises:

in a Cartesian coordinate system, rewriting the differential equation of the oscillator circuit into a controller state space model with an effective value of a voltage amplitude and an instantaneous phase as target in combination with a time domain equation and a steady-state limit cycle of a nonlinear oscillator average model;

determining a polar coordinate form of the controller state space model according to a polar coordinate transformation equation;

simplifying the polar coordinate form by using an averaging method, and determining an averaging system corresponding to a periodic system;

determining the differential equation of the controller averaging system by using the averaging system.

19. The non-transitory computer-readable storage medium according to claim 16, wherein the voltage gain factor of the voltage gain is: $K_v := \overline{V}_{oc}$; where $K_v$ is a voltage gain factor; $\overline{V}_{oc}$ is a steady-state open-circuit voltage; the current gain factor of the current gain is:

$$K_i := \dfrac{\overline{V}_{min}}{\overline{P}_{rated}};$$

where $K_i$ is a current gain factor; $\overline{V}_{min}$ is a minimum terminal voltage of the inverter; $\overline{P}_{rated}$ is a maximum rated load.

20. The non-transitory computer-readable storage medium according to claim 19, wherein the designing voltage regulation parameters specifically comprises:

determining the conductance according to the steady-state open-circuit voltage and the minimum terminal voltage of the inverter;

determining the controlled current source cubic coefficient according to the conductance.

\* \* \* \* \*